United States Patent [19]

Clanciosi et al.

[11] Patent Number: 5,504,462

[45] Date of Patent: Apr. 2, 1996

[54] APPARATUS FOR ENHANCING PIXEL ADDRESSABILITY IN A PULSE WIDTH AND POSITION MODULATED SYSTEM

[75] Inventors: Michael S. Clanciosi, Rochester; Martin E. Banton, Fairport, both of N.Y.

[73] Assignee: Xerox Corporation, Stamford, Conn.

[21] Appl. No.: 118,858

[22] Filed: Sep. 10, 1993

[51] Int. Cl.[6] .............................. H03K 7/08; G09G 5/10
[52] U.S. Cl. .......................... 332/109; 327/176; 345/148
[58] Field of Search ............................ 332/109; 358/296, 358/298, 300, 409, 410; 346/108, 160; 345/147, 148; 327/106, 107, 130, 172, 176

[56] References Cited

U.S. PATENT DOCUMENTS

| | | | |
|---|---|---|---|
| 4,347,523 | 8/1982 | Ohara | 346/108 |
| 4,375,065 | 2/1983 | Ohara | 346/108 |
| 4,390,882 | 6/1983 | Ohara et al. | 346/1.1 |
| 4,544,264 | 10/1985 | Bassetti et al. | 355/14 R |
| 4,544,922 | 10/1985 | Watanabe et al. | 340/728 |
| 4,625,222 | 11/1986 | Bassetti et al. | 346/160 |
| 4,626,923 | 12/1986 | Yoshida | 353/283 |
| 4,661,859 | 4/1987 | Mailloux et al. | 358/283 |
| 4,905,023 | 2/1990 | Suzuki | 346/108 |
| 4,926,268 | 5/1990 | Kawamura et al. | 358/458 |
| 4,933,689 | 6/1990 | Yoknis | 346/154 |
| 4,965,672 | 10/1990 | Duke et al. | 358/298 |
| 5,144,337 | 9/1992 | Imamura et al. | 346/108 |
| 5,144,338 | 9/1992 | Sakano | 346/108 |
| 5,184,226 | 2/1993 | Cianciosi | 358/296 |
| 5,193,011 | 3/1993 | Dir et al. | 358/455 |
| 5,198,785 | 3/1993 | Jordan | 332/109 |

OTHER PUBLICATIONS

L. Steidel in "Technology Overview: Resolution Enhancement Technologies for Laser Printers," *LaserMaster Corp.*; Sep. 1991; pp. 1–14.

*Primary Examiner*—David Mis
*Attorney, Agent, or Firm*—Duane C. Basch

[57] ABSTRACT

The present invention is a digital electronics system for generating multiple pulses within a predefined pixel clock period in a digital output device, where both a leading edge delay and a trailing edge delay are specified for a first pulse to be generated during the predetermined clock period. Pulse forming circuitry generates the first pulse during the portion of the clock period between the leading edge delay and the trailing edge delay, and an inverting circuit, selectable on a clock period basis, is activated to produce complimentary pulses within the selected clock period. The system is depicted as a two phase embodiment which enables high-speed operation.

16 Claims, 8 Drawing Sheets

APPARATUS FOR ENHANCING PIXEL ADDRESSABILITY IN A PULSE WIDTH AND POSITION MODULATED SYSTEM

This invention relates generally to a apparatus for enhancing pixel addressability in a digital imaging system, and more particularly to a digital pulse width and position modulator, which generates complimentary video pulses.

BACKGROUND AND SUMMARY OF THE INVENTION

The present invention is intended for use in a scanning output system that uses a beam for generating information, or more specifically, wherever a digital pulse forming circuit may be used to control a scanning beam. The beam may vary in intensity and duration according to the pulses used to control the beam. For example, a laser beam may be used in a printer for selectively exposing areas on a photoreceptor. The latent electrostatic image formed on the photoreceptor by the beam exposure attracts developing toner in proportion to the latent image charge level to develop the image. As another example, a cathode ray tube uses an electron beam to scan a phosphorous screen. The electron beam may be varied in intensity and duration to accurately display information on the phosphorous screen. In both examples, a pulse forming circuit may be used to generate video pulses to control the intensity and operation time of the respective beams.

Heretofore, various methods and apparatus have been used to vary the position and width of pulses used to control laser or CRT beams. The following disclosures may be relevant:

U.S. Pat. No. 4,347,523, also to Ohara, discloses an apparatus of general interest which uses an input signal to address pulse numbers with corresponding pulse width selection numbers.

U.S. Pat. No. 4,375,065 to Ohara describes an apparatus of general interest that uses pulse number and pulse position modulation to control a laser beam.

U.S. Pat. No. 4,390,882 to Ohara et al. discloses for an image processing apparatus a method of adjusting the image density by controlling the on time of the laser. Control of the laser on time is performed by a multivibrator having a variable RC time constant.

U.S. Pat. No. 4,544,264 and U.S. Pat. No. 4,625,222, both issued to Bassetti et al. describe enhancement circuits suitable for use in a laser based electrophotographic printing machine. The enhancements are directed at modifying the digital drive signals used to produce the image, including smoothing digitized edges and broadening fine lines in both the horizontal and vertical directions. Leading and trailing edge signals, in both directions are provided to potentially print each black pixel or line as a series of three pixels, a gray leading pixel, overlapped by a central black pixel, which is in turn overlapped by a gray trailing pixel. A similar process is applied for scanlines as well. The series of signals are recombined to effectively control the voltage and current levels of a laser driver.

U.S. Pat. No. 4,544,922 to Watanabe et al. teaches a smoothing circuit for an orthogonal matrix display. The circuit adds or removes a "small dot" on the display from either the first or last third of a dot clock (DCK) period which is one-third the period in which a standard dot of the original pattern is displayed.

U.S. Pat. No. 4,626,923 to Yoshida teaches an image processing apparatus for producing a halftone image in which the on time of the laser is controlled by both the image input data and a pulse width modulation circuit. The image data is transferred under control of clock signal, CLK. The pulse width modulation circuit includes a clock, CLKH, having a frequency three times that of CLK, which is used together with latches and AND gates to provide synchronous sub-pixel addressing.

U.S. Pat. No. 4,661,859 to Mailloux et al. describes an image processing circuit for producing a greyscale image in which the on time of the laser is controlled by both the video input data and the pulse width modulation circuit. The pulse width modulation circuit includes a clock having a frequency greater than the video data rate, which allows synchronous sub-pixel addressing.

U.S. Pat. No. 4,905,023 to Suzuki, describes an image forming apparatus using a plurality of conversion tables addressed by an input video image signal to generate pulses.

U.S. Pat. No. 4,926,268 to Kawamura et al. discloses an image processing apparatus which employs analog circuitry to produce a pulse-width modulated (PWM) output from a multi-level digital signal. As described, each analog signal is generated in synchronism with the pixel clocks.

U.S. Pat. No. 4,933,689 to Yoknis describes a method for enhancing a displayed image in a laser exposed dot matrix format to produce softened edge contours. Using three pulses, a central pulse plus leading and trailing enhancement pulses which are separated therefrom. The purpose of the leading and trailing pulses is to create a blurred or grayed region at the leading and trailing edges of each associated character.

U.S. Pat. No. 4,965,672 to Duke et al. discloses an apparatus for varying the width and position of pulses used to control a laser beam.

U.S. Pat. No. 5,144,337 to Imamura et al. teaches an image forming apparatus suitable for changing the size of an output dot in a main and subscanning direction. Dot size and shape are controlled by pulse width modulation and power modulation applied to a laser diode.

U.S. Pat. No. 5,144,338 to Sakano discloses an image recorder which employs a pulse width modulated laser beam to control the recording position on a photoconductive drum. The position (left aligned, centered, or right aligned) and duration (12 ns, 20 ns, 32 ns, or 56 ns) of the pulse within a pixel interval is determined based upon the tone level of the pixel of interest and its relation to the tone levels of both preceding and following pixels.

U.S. Pat. No. 5,184,226 to Cianciosi describes a digital system for generating pulses from a series of data words, the relevant portions of which are hereby incorporated by reference. The system employs multiple RAM look-up tables for translating the data words into a series of corresponding pulses utilizing two channels to achieve the desired throughput.

U.S. Pat. No. 5,193,011 to Dir et al. discloses a system for printing gray levels without the need of a halftone cell. The system determines the pulse width for each pixel as a function of the gray level of the pixel, based upon an iterative comparison to an incrementing grey level clock. In one embodiment, a page-wide liquid crystal shutter is used to regulate the exposure of a photoconductive drum. The shutter may be toggled on and off multiple times for each pixel during the recording of a single row of the image.

L. Steidel in "Technology Overview: Resolution Enhancement Technologies for Laser Printers", *LaserMas-* ter Corp., discusses three currently available implementations for vertical resolution enhancement, Resolution Enhancement Technology, Paired Scan Line Scheme, and TurboRes. In all cases, the horizontal resolution of the laser scanner is increased by increasing the clock speed. On the other hand, the vertical resolution is enhanced by combining the weaker laser laser energy from a brief laser flash, which leaves only residual or fringe energy on the image drum at the periphery of a pixel of an adjacent pixel on a second scan line.

An object of the present invention is to provide a pulse width position modulation system having the capability to selectively produce multiple pulses within a predefined pixel clock period without the necessity of increasing the speed of the hardware used to produce the pulses.

Another object of the present invention is to enable the pulse width position modulation system to selectively produce pulses which are justified with the beginning and end of a predefined pixel clock period so as to enable the extension of adjacent pulses produced in preceding or succeeding clock periods.

In accordance with the present invention, there is provided an apparatus for generating multiple pulses within a predefined clock period. The apparatus comprises means for specifying the leading edge delay for a first pulse to be generated during the predefined clock period, means for specifying the trailing edge delay for the first pulse to be generated during the predefined clock period, means for generating the first pulse during the portion of the clock period between the leading edge delay and the trailing edge delay, and means, selectable on a clock period basis, for inverting the first pulse to produce a pair of complimentary pulses within the selected clock period.

In accordance with another aspect of the present invention, there is provided a digital electronics system capable of generating pulses within predefined clock periods which delimit pixel boundaries. The system includes an apparatus for extending the pulses beyond the pixel boundaries, comprising, means for specifying the leading edge delay for a first pulse to be generated during the predetermined clock period, means for specifying the trailing edge delay for the first pulse to be generated during the predetermined clock period, means for generating the first pulse during the portion of the clock period between the leading edge delay and the trailing edge delay, and means, selectable on a clock period basis, for inverting the first pulse to produce a pair of complimentary, boundary justified pulses within the selected clock period, said boundary justified pulses thereby extending the pulses generated during a preceding and a succeeding clock period.

In accordance with yet another aspect of the present invention, there is provided a digital electronics system for generating pulses from a series of data words, comprising means for translating the series of data words into a series of pulse attribute words, wherein each pulse attribute word includes information for controlling the formation of a corresponding pulse during a clock period, means for splitting the series of pulse attribute words into two channels, means corresponding to each channel for accepting pulse attribute words from respective channels, and forming pulses using the information included in the pulse attribute words for controlling the formation of the pulses, means for generating the pulses, wherein a pulse from a first pulse forming means is generated while a pulse from a second pulse forming means is being formed, and means for inverting the pulse generated during a selected clock period to produce a pair of complimentary pulses within the selected period.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

Figure 1:
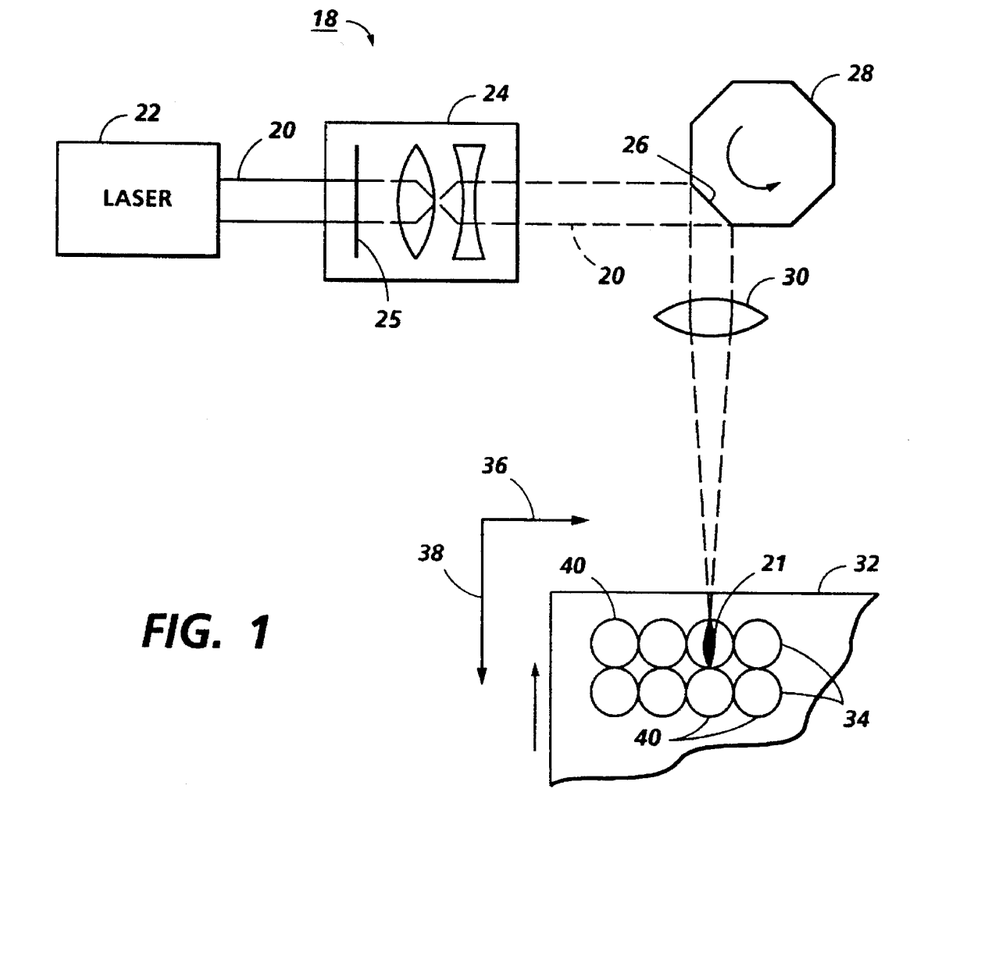
FIG. 1 is a schematic illustration of a Raster Output Scanner (ROS), illustrating a portion of the photosensitive image plane.

For a general understanding of the present invention, reference is made to the drawings. In the drawings, like reference numerals have been used throughout to designate identical elements. FIG. 1 shows a raster output scanner (ROS) which may be used to print video signals produced by a source (not shown). There are two common types of ROS 18, flying spot and pulse imaging ROSs. In both, a laser beam 20, emitted from laser 22, passes into conditioning optics 24 which includes a modulator 25. For precise periods of time, determined in response to video signals supplied to ROS 18, modulator 25 either blocks or deflects the laser beam, or allows to the beam to pass through the conditioning optics to illuminate a facet 26 of rotating polygon 28. Laser 22 may be a helium-neon laser or a laser diode. In the latter case, the video data would directly modulate the laser rather than modulator 25. In addition, more than a single laser source 22 or beam 20 could be employed to practice the invention.

After reflecting off facet 26, laser beam 20 passes through conditioning optics 30 and forms a spot 21 on photosensitive image plane 32. The rotating facet causes laser spot 21 to scan across the image plane in a line 34. Line 34 lies in what is commonly referred to as the fast scan direction, represented by arrow 36. In addition, as facet 26 rotates, image plane 32 moves in a slow scan direction, substantially perpendicular to the fast scan direction, as represented by arrow 38. Movement in the slow scan direction is such that successive rotating facets of the polygon for successive scanlines 34 that are offset from each other in the slow scan direction.

Each scan line 34 consists of a row of pixels 40, wherein the pixels are produced by the modulation of the laser beam as laser spot 21 scans across the image plane. As beam 20 scans across the scanline, pixel spot 21 either illuminates or does not illuminate the individual pixel, in accordance with the video signals provided to ROS. In general, the video signals may be characterized as a serial stream of binary pulses, where a logic one or a pulse specifies that the beam is to illuminate the surface, while a logic zero, no pulse, will result in no illumination.

For both types of ROS, the width of pixel 40 is dependent upon the period or duration of the corresponding logic one pulse in the video signal supplied to ROS 18. In a scanning spot ROS, at the leading edge of a pulse, for example edge 50 of FIG. 2A, modulator 25 allows the passage of laser beam 20 onto the image plane. For the duration of the pulse, and oval shaped laser spot 21 is scanned across image plane 32, illuminating at least one addressed pixel 40 within the scan line 34. The width of the illuminated region in the fast scan direction thus depends on the duration of the video pulse, as well as on the width and scanning rate of laser spot 21. Typically, the dimensions of the laser spot are such that it is two to three times taller in the slow scan direction than its width in the fast scan direction. As an example, in a 600 spi, 135 ppm, dual beam printer, the laser spot is approximately 43 μm high and 20 μm wide, and the time period required for the spot to scan across the width of a single pixel 40 is about 15 nanoseconds.

Typically, the video data used to drive the ROS is clocked so that the period within which each pixel is exposed, referred to hereafter as a pixel clock period, is the same. In addition, the video data used to generate the video signal pulses which drive the modulator are also synchronized with ROS 18 and the movement of the image plane 32 in the slow scan direction, thereby allowing a particular bit of video data to address an appropriate portion of image plane 32. The synchronization of the video data, the video signal pulses produced therefrom, the ROS and the image plane is achieved through the use of a system clock that is equivalent to the rate at which pixels must be exposed on the image plane. While faster clocks may allow greater resolution within the video pulse stream, a higher frequency also results in increased costs for faster hardware within the video processing path.

In the present embodiment, a pulse width, position, and amplitude modulator (pulse modulator) is utilized to form the video signal pulses in response to video data representing the image to be printed. Referring to FIGS. 2A through 5, it should be noted that while the following description of the pulse modulator is directed toward a single color output, there is no intent to limit the application of the present invention in such a manner.

Figures 2A, 2B:
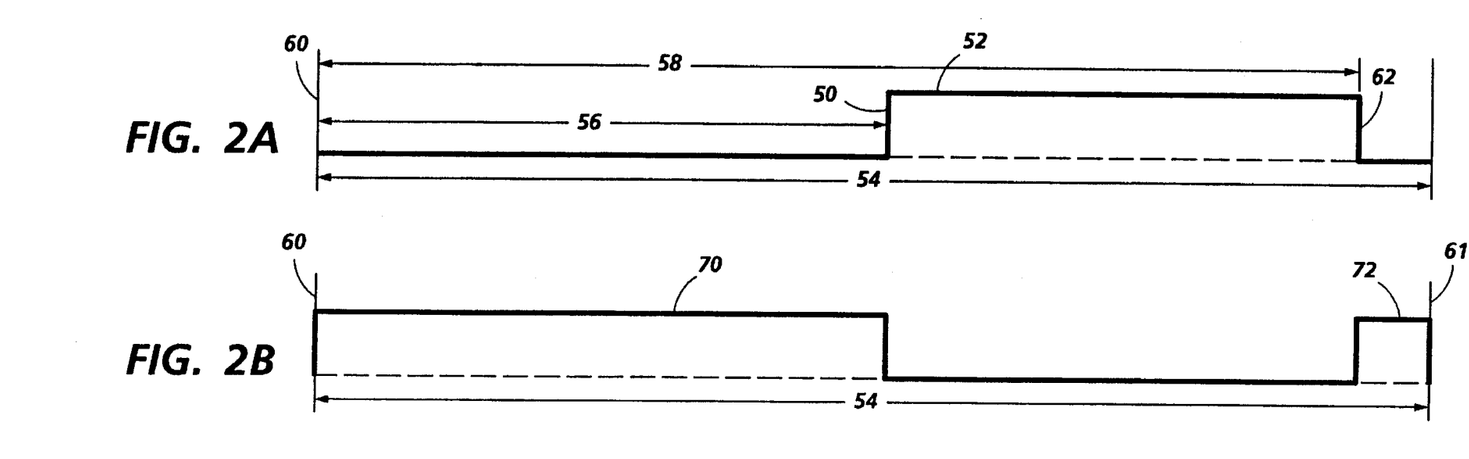
FIG. 2A is a schematic illustration showing an example of a pulse with variable width and position.
FIGS. 2B is a schematic illustration of the complimentary pulses produced using the pulse of FIG. 2A in accordance with an embodiment of the present invention.
Figure 3A:
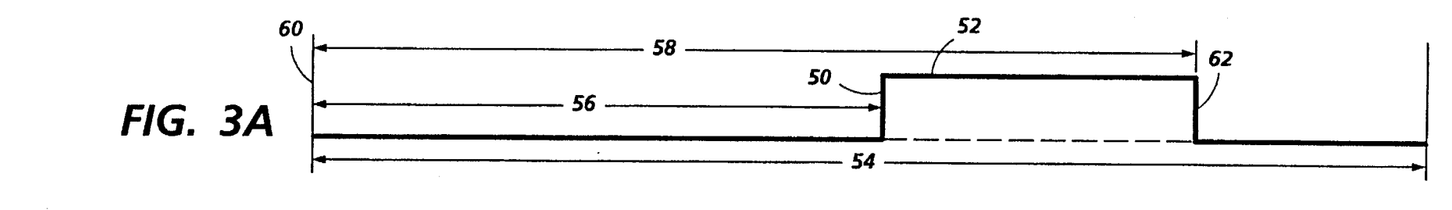
FIG. 3A is a schematic illustration showing an example of a pulse with variable width and position.

FIGS. 2A and 3A show the general organization for pulse formation of the pulse modulator. Moreover, FIGS. 2A and 3A show exemplary pulse characteristics for first or primary video pulse signals generated by the invention. As shown by the two pulses represented in the figures, the width and position of a pulse 52 within a pixel clock period 54 may be varied with separate, independently variable delays for the leading edge 56 and trailing edge 58 of the pulse 52. A leading edge delay 56 is defined from the beginning of a pixel period 60 to the leading edge of the pulse 50. A trailing edge delay 58 is defined from the beginning of a pixel period 60 to the trailing edge of the pulse 62. In a normal operating mode, pulse 52 would be generated in response to information in a corresponding data word, as disclosed in U.S. Pat. No. 5,184,226 to Cianciosi, issued Feb. 2, 1993, the relevant portions of which are hereby incorporated by reference.

Generally, each pulse 52 is formed according to the information in a corresponding data word. A series of data words is input into a pulse modulator (not shown), and each data word is consecutively translated into a set of pulse attribute words. Each pulse attribute word corresponds to a characteristic of a corresponding pulse to be formed by the pulse modulator. Thus, each data word contains the information for forming a pulse.

The architecture of the pulse modulator will now be described with reference to FIG. 4. A series of data words, each n bits per pixel where n is 8 in the preferred embodiment, is input into the pulse modulator from a video or image source 101, such as a computer memory or an image scanner. The series of data words may be sent through a video expansion port 103 to other pulse modulators (not shown) for parallel processing, such as in the case of color printing where similar processing of the video information is performed for different colors.

The present invention further includes translating means, splitting means, pulse forming means, and generating means. In the pulse modulator of FIG. 4, a data word from the series is sent through a RAM address multiplexer 105 to a translating means. As embodied herein, the translating means comprises four RAM lookup tables 107, 109, 111, and 113. Each data word represents an address within the four RAM lookup tables 107, 109, 111, and 113. In a preferred embodiment, a pair of 256×4 ECL RAM lookup tables is used to generate a pulse attribute word for each pulse attribute sought to be controlled.

Pulse attributes may include leading edge delay, trailing edge delay, amplitude of the pulse to be formed, and other special features such as an inverted or multiple pulse per pixel selection, as will be described with respect to the present invention. Alternatively, a single 256×8 ECL RAM lookup table may be used to generate each pulse attribute word. The embodiment of FIG. 4 shows two pairs of 256×4 RAM lookup tables 107 and 109, 111 and 113 which correspond to the two pulse attributes of leading edge delay and trailing edge delay. The pulse modulator will accommodate as many pairs of 256×4 RAM lookup tables as there are desired pulse attributes. For example, a third pair of 256×4 RAM lookup tables may be used to control the amplitude of a pulse to be formed. Alternatively, a series of RAM addresses in the lookup tables may be assigned to produce inverted pulses. For example, addresses 64–127 would be decoded so that the pulses produced in response to the data output from those table locations would be inverted. Furthermore, a larger or smaller number of addresses may be used, or allocated, for the production of inverted pulses.

Once an address in each RAM lookup table is accessed by the data word, each RAM lookup table generates a nibble (4 bits) of information. Thus, each pair of RAM lookup tables generates a pulse attribute word (8 bits) corresponding to the pulse attribute sought to be controlled. While an 8-bit implementation may be preferable, it is not a limitation, and the pulse attribute word may be any number of bits (i.e., 4, 6, 8, 10, 12, etc.).

Characteristic data indicative of the pulse attributes sought to be controlled in a pulse modulator may be downloaded into the RAM lookup tables 107, 109, 111, and 113 from the lookup table download interface 115. Once the lookup table download interface 115 accesses an address of a RAM lookup table, a pulse attribute data nibble may be loaded into the RAM lookup table through the lookup table data bus 117 from the lookup table download interface 115. This allows for different mapping functions in the same pulse modulator for different printing characteristics (i.e., font smoothing, graphics, etc.), and further facilitates maintenance of print quality as the components of the system age. After the RAM lookup tables 107, 109, 111, and 113 are loaded, the lookup table download interface 115 instructs the RAM address multiplexer 105 to receive data from the video data bus 119.

Figure 4:
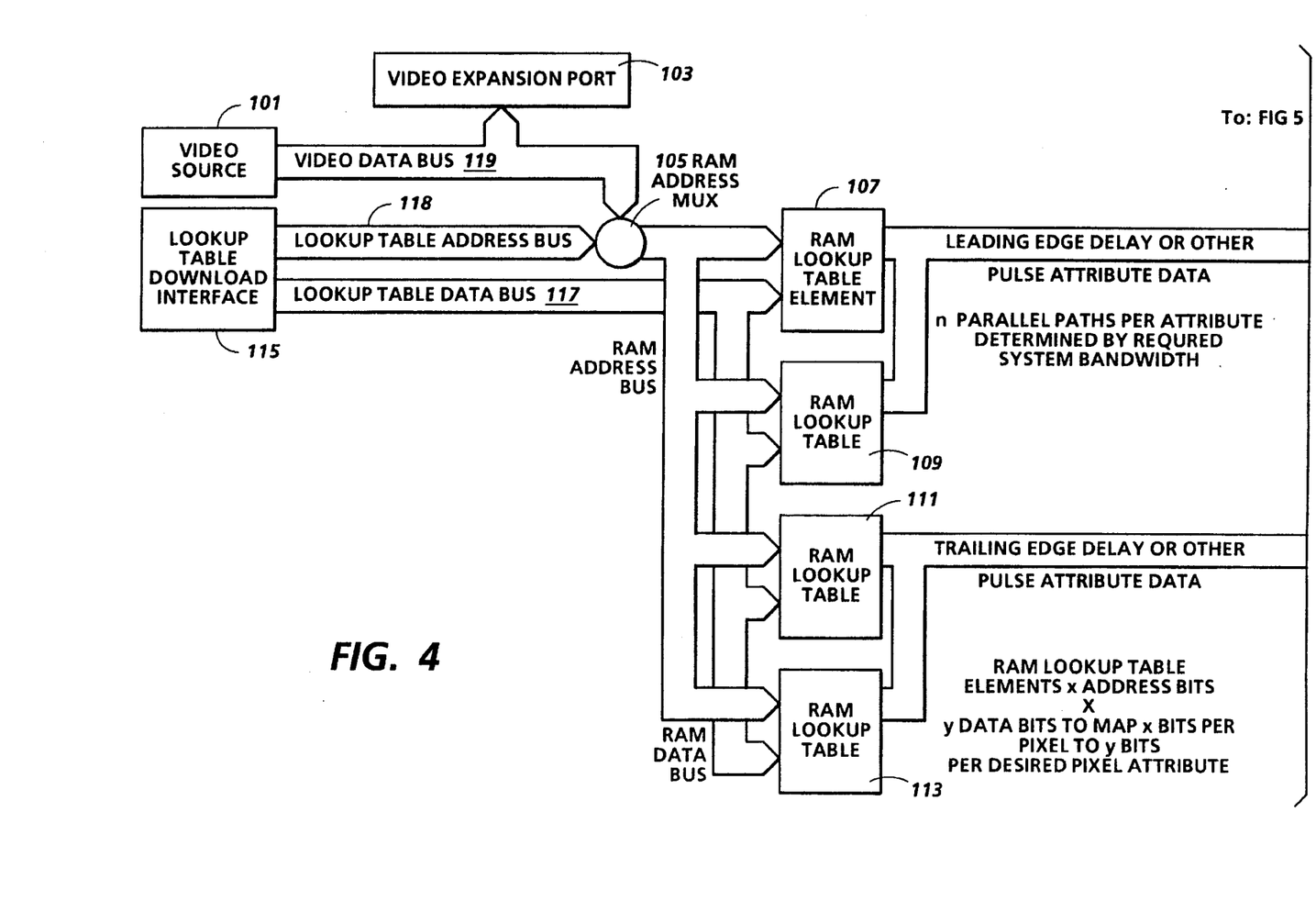
FIGS. 4 and 5 are a schematic block diagram of a pulse modulator according to an embodiment of the present invention.

In the embodiment of FIG. 4, the four RAM lookup tables 107, 109, 111, and 113 perform a logic mapping function, which translates the incoming data word into two pulse attribute words to control the formation of a pulse. In FIG. 4, the top two RAM lookup tables 107 and 109 generate separate nibbles of pulse attribute information which combine to form a pulse attribute word for the leading edge delay of a pulse to be formed. The bottom two RAM lookup tables 111 and 113 generate separate nibbles of pulse attribute information which combine to form a pulse attribute word for the trailing edge delay of a pulse to be formed.

Each pulse attribute word is fed to a respective splitting means which comprises multiplexer and latch blocks 121 and 123. In the preferred embodiment, each respective multiplexer and latch block contains two latches, one for each of the phase 1 and phase 2 buses. The two pulse attribute words generated in the RAM lookup tables 107, 109, 111, and 113 from a data word are latched onto the phase 1 buses by their respective multiplexers 121 and 123 at a leading edge of a pulse from the phase 1 video clock 135.

The two data words latched on their respective phase 1 buses 125 and 127 are further processed on separate channels in a pulse forming means corresponding to each channel. As depicted, the pulse forming means comprises a delay logic block 129 for forming separate leading and trailing edge delayed pulses and a video pulse forming logic block 131. The video pulse forming logic block 131, which comprises the generating means, forms a single pulse from the leading and trailing edge delay pulses. Subsequent to generation of the first or normal pulse in the video pulse forming logic block 131, the pulse may be inverted under the control of the combination logic block 149.

Figure 5:
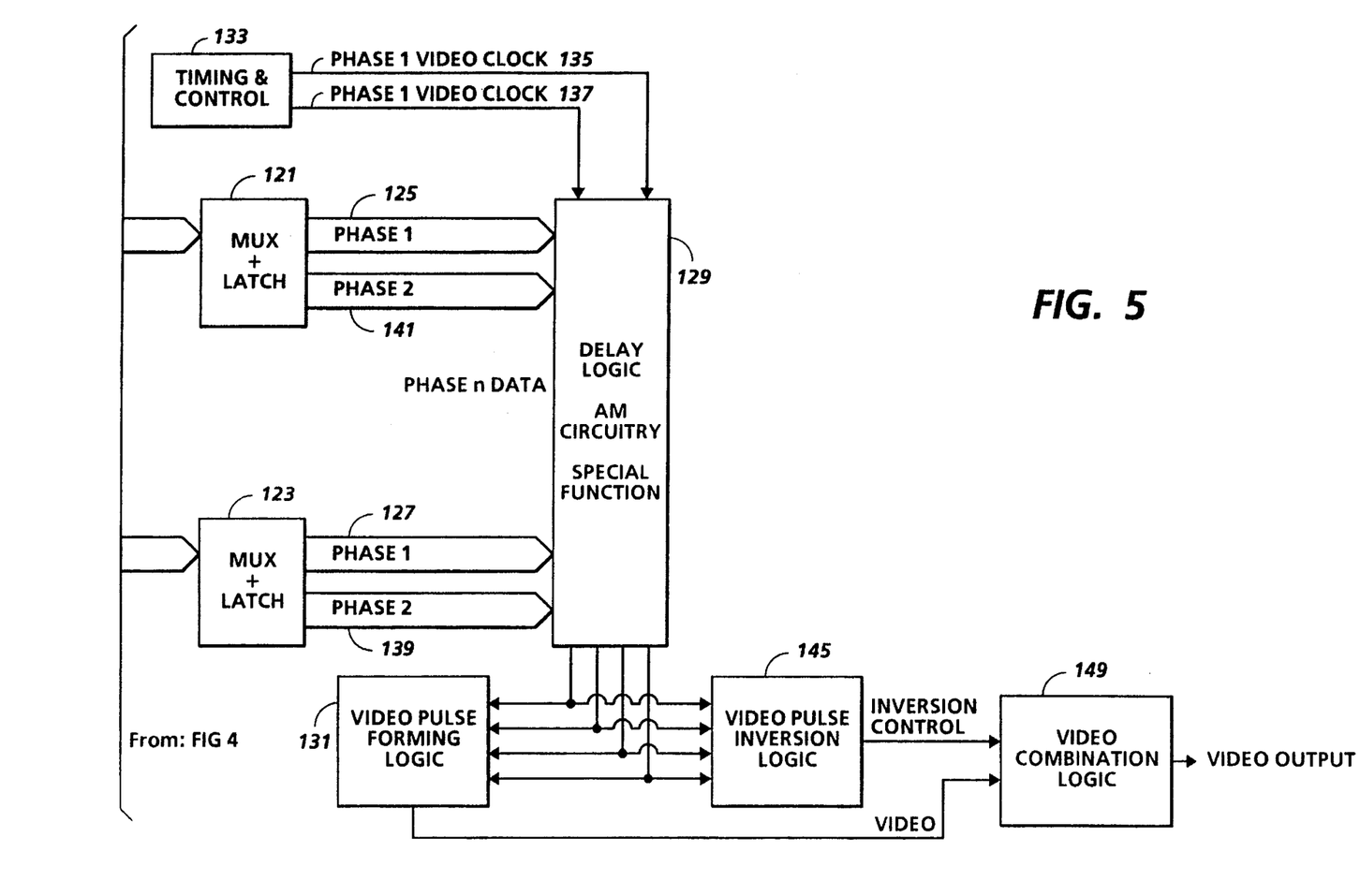

As represented by the preferred embodiment depicted in FIG. 5, combination logic block 149 may be an XOR gate. Video combination logic block 149 allows the video signal from video pulse forming logic block 131 to pass unaltered if a logic zero is present on the inversion control line. On the other hand, at any time the video pulse inversion logic block 145 should produce a logic one on the inversion control line, the video pulse signal output from block 131 will be inverted so as to form a pair of video pulses.

It is noted that the speed of a typical scanning system, with only a single phase video clock and corresponding phased set of busses, is limited by the speed at which its delay and pulse forming logic 129 and 131 can operate on pulse attribute words and then be reset to accept new pulse attribute words. In the embodiment shown in FIG. 4, with only the phase 1 video clock 135 and phase 1 busses 125 and 127, the delay and pulse forming logic blocks 129 and 131 may limit the processing speed of the pulse modulator. Specifically, while the two pulse attribute words corresponding to the first data word are being processed by the delay and pulse forming logic blocks 129 and 131, a second pair of pulse attribute words corresponding to a second data word will already be formed, waiting at the respective multiplexer and latch blocks 121 and 123 to be latched onto the phase 1 busses 125 and 127 and processed by the delay and pulse forming logic 129 and 131.

Figure 3B:
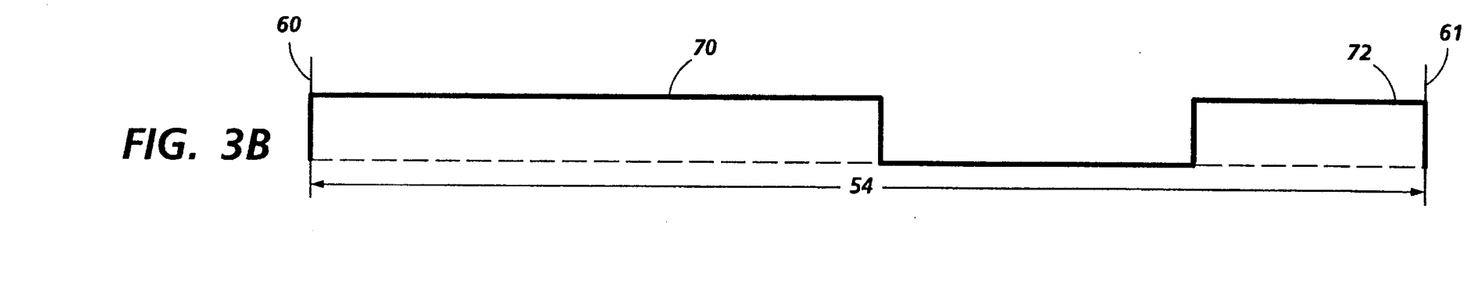
FIGS. 3B is a schematic illustration of the complimentary pulses produced using the pulse of FIG. 3A in accordance with an embodiment of the present invention.

Referring once again to FIGS. 2A, B and 3A, B, where the representative signals are illustrated, FIGS. 2A and 3A are intended to represent the first or normal video signal pulse output from video pulse forming logic block 131. As previously described pulses 52 have a position and width defined by the leading and trailing edge delays stored in the RAM lookup tables. Although FIGS. 2A and 2B, depict pulses 52 which lie entirely within clock period 54, the pulses could also extend so as to be justified with a boundary of the clock period. Furthermore, the same "normal" video pulses may also be used to produce one or two complimentary or inverted pulses, 70 and 72, justified to the respective pixel clock boundaries, 60 and 61 as depicted in FIGS. 2B and 3B. Because they are defined over the same pixel period 54, the characteristics of complimentary pulses 70 and 72 are also directly controllable by the previously described pulse attribute words.

Figure 6:
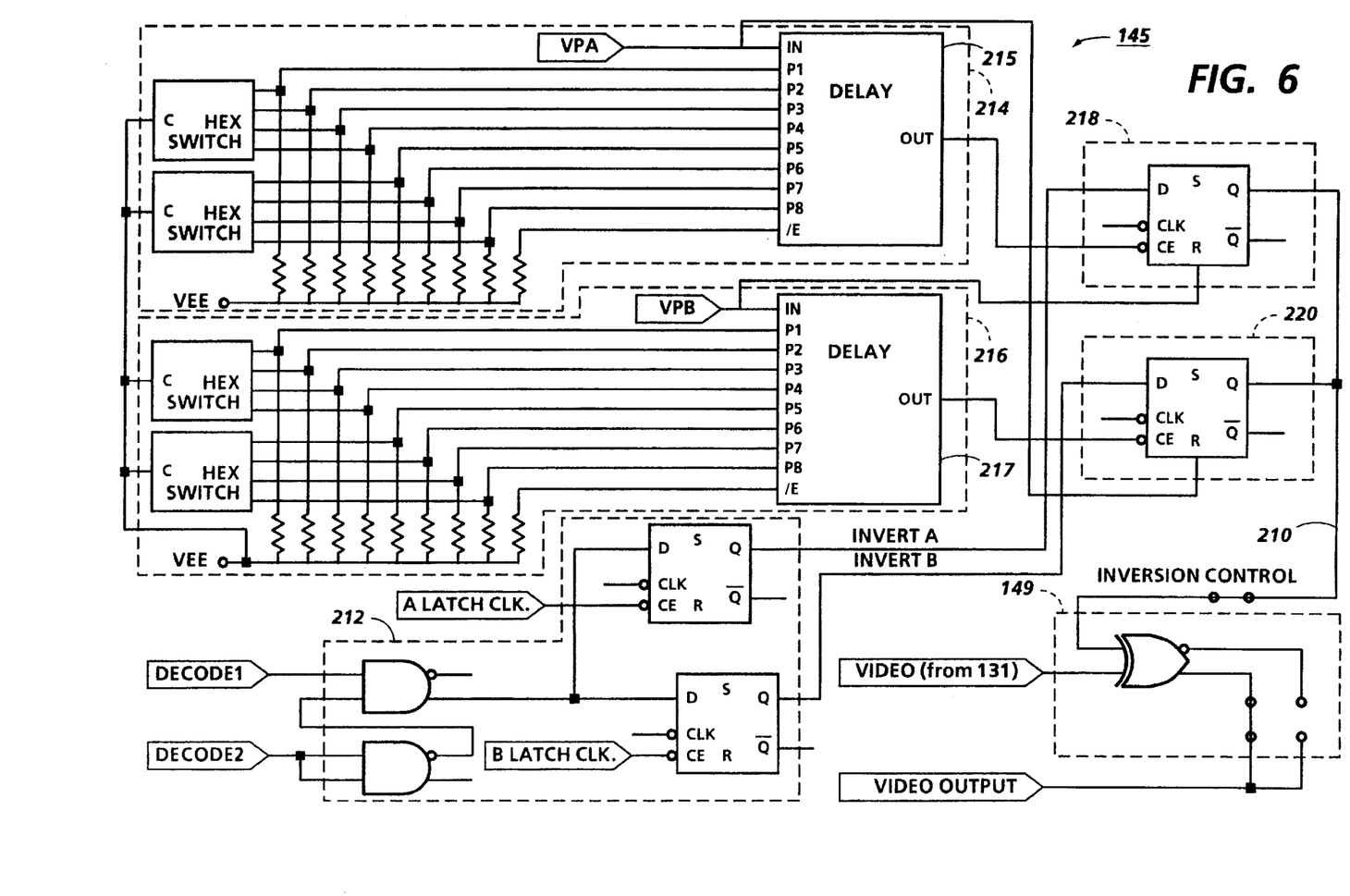
FIG. 6 is a schematic diagram illustrating the detail of the video pulse inversion and combination logic blocks depicted in FIG. 5.
Figure 7:
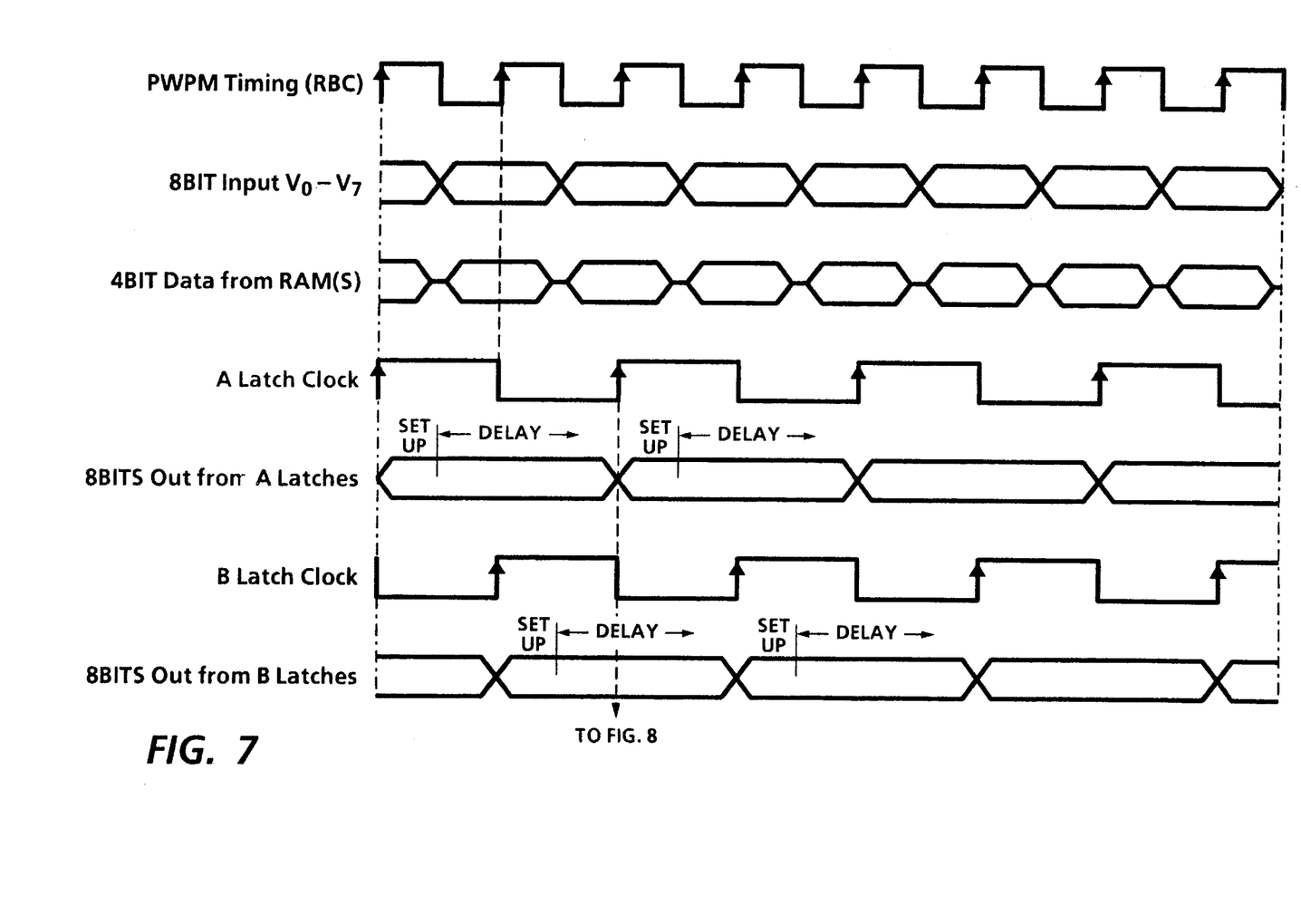
FIGS. 7 through 9 illustrate timing diagrams for the various signals used in the video pulse inversion and combination logic blocks depicted in detail in FIG. 6.
Figure 8:
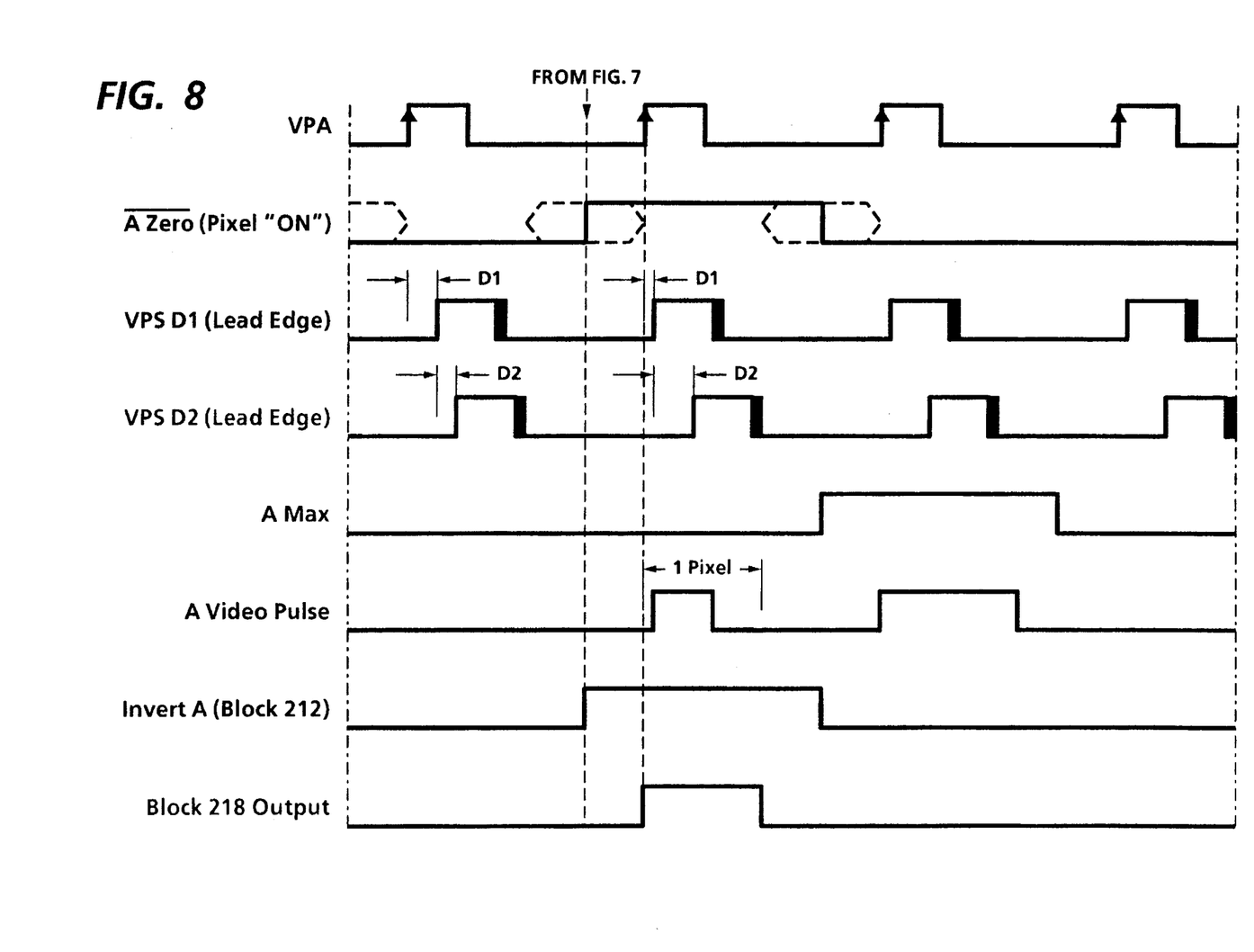
Figure 9:
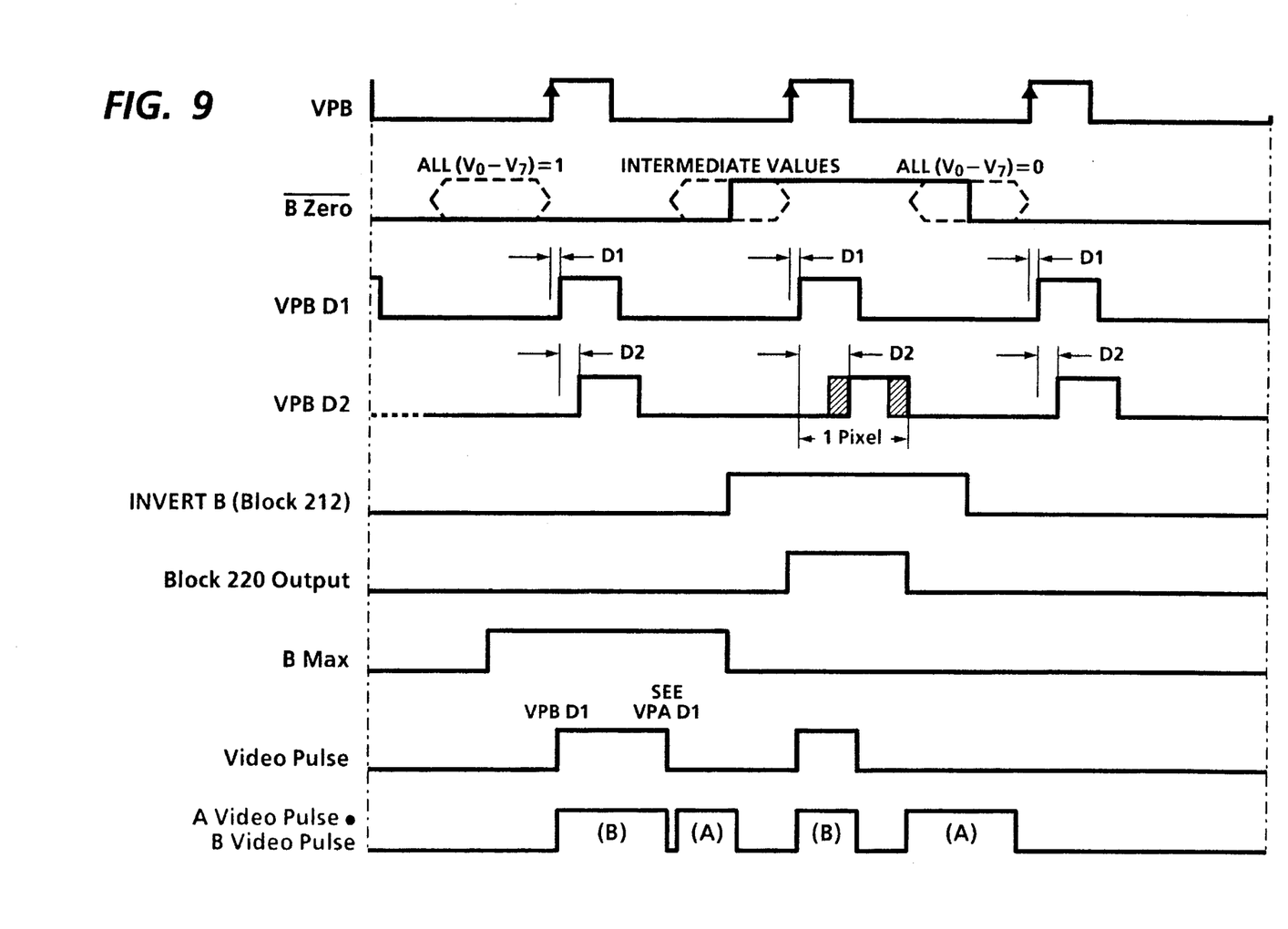

Referring also to FIG. 6, along with timing diagrams of FIGS. 7–9, where the details of the video inverting means are illustrated, it can be seen that inversion logic block 145 is designed to correctly synchronize the timing of the inversion control signal on line 210 with the video pulse signal output by video pulse forming logic block 131. More specifically, it is necessary to assure that the selection signal provided on inversion control line 210 be produced in synchronization with the video signal in order to assure accurate control of the video output signal on pixel boundaries. As illustrated, the video pulse inversion logic block 145 is comprised of pulse decoding block 212, a pair of pulse skew adjusting blocks, 214 and 216, and a corresponding pair of inverting blocks, 218 and 220. Pulse decoding block 212 is intended to detect and decode the video data signals from the RAM Address Bus in order to determine which pulses are to be selectively inverted to produce desired complimentary pulses. More specifically, the necessary synchronization is achieved using the A LATCH CLOCK and B LATCH CLOCK signals, input to block 212, to initiate the timing delay within the inversion logic block. The DECODE 1 and DECODE2 signals are used to enable the inversion block. In one embodiment, the two most-significant bits ($A_6$ and $A_7$) of the 8-bit video address being input to the ROM lookup tables may be used for DECODE 1 and DECODE2. Thus, whenever the upper 128 addresses of the lookup table are accessed, the inversion block will be enabled. Subsequently the A and B phase pulses are routed through skew adjusting blocks 214 and 216 (e.g., programmable delay circuits) in order to compensate for timing skew, such as gate delays, between the inverted and non-inverted pulse paths. Skew adjusting blocks 214 and 216 both adjust for any timing skew between the pulse width position modulated channels (A and B) in the present embodiment. Programmable hex switches are used to establish the delays (D1 and D2 in FIGS. 8 and 9) with delay devices 215 and 217. Both skew adjusting blocks include circuitry to align the inverted video output pulse in an appropriate spatial relationship with the non-inverted video output pulse. More specifically, the rising edge of the inverted pulse is aligned with the edge of a non-inverted pulse having a programmed delay of zero. Lastly, inverting blocks 218 and 220 capture the decoded pulse signals and skew adjustment signals produced by blocks 214 and 216, respectively, to produce a skew adjusted, inversion control signal which may be combined with the video pulses at combination logic block 149 to selectively produce the complimentary dual pulse video output.

In recapitulation, the present invention is an apparatus for improving the addressability of a system employing a pulse width and position modulated signal. The invention enables the selective generation of video signals having pulses which extend beyond clocked pixel boundaries. A pair of pixel clock boundary justified pulses are produced by generating the compliment to a normal pulse width and position modulated video pulse.

It is, therefore, apparent that there has been provided, in accordance with the present invention, an apparatus for enhancing pixel addressability in a digital output device. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. An apparatus for generating multiple pulses within a selected clock period, comprising:

means for specifying the leading edge delay for a first pulse to be generated during the selected clock period;

means for specifying the trailing edge delay for the first pulse to be generated during the selected clock period;

means for generating the first pulse during the portion of the selected clock period between the leading edge delay and the trailing edge delay; and means, selectable on a clock period basis, for inverting the first pulse to produce a complimentary pulse within the selected clock period.

2. The apparatus of claim 1, wherein said inverting means comprises:

inversion selecting means for producing an active inversion control signal only during the selected clock period; and means, responsive to said inversion selecting means, for combining the inversion control signal and the first pulse to produce a complimentary pulse whenever the inversion control signal is active.

3. The apparatus of claim 2, wherein the active inversion signal is produced in synchronization with the clock period.

4. The apparatus of claim 1, wherein:

the first pulse is generated entirely within the selected clock period; and said inverting means thereby produces a pair of complimentary pulses within the selected clock period.

5. The apparatus of claim 4, wherein said inverting means comprises:

inversion selecting means for producing an inversion control signal only during the selected clock period; and means, responsive to said inversion control signal, for combining the inversion control signal and the first pulse to produce a pair of complimentary pulses whenever the inversion control signal is active.

6. The apparatus of claim 4, wherein the inversion signal is produced in synchronization with the clock period.

7. The apparatus of claim 4, wherein a first complimentary pulse begins at the beginning of the selected clock period and a second complimentary pulse ends at the end of the selected clock period, said first and second complimentary pulses being separated by a time interval equal to the difference between the trailing edge delay and the leading edge delay.

8. In a digital electronics system capable of generating pulses within predefined pixel clock periods which delimit pixel boundaries, an apparatus for extending the pulses beyond the pixel boundaries, comprising:

means for specifying the leading edge delay for a first pulse to be generated during a selected pixel clock period;

means for specifying the trailing edge delay for the first pulse to be generated during the selected pixel clock period;

means for generating the first pulse during the portion of the selected pixel clock period between the leading edge delay and the trailing edge delay; and means, selectable on a pixel clock period basis, for inverting the first pulse to produce a first complimentary pulse within the selected clock period, said first complimentary pulse being justified at the beginning of the selected pixel clock period and thereby extends a pulse generated during a preceding pixel clock period.

9. The apparatus of claim 8, wherein said inverting means further produces a second complimentary pulse, said second complimentary pulse being justified at the end of the selected pixel clock period and thereby extends, into the selected pixel clock period, the beginning of a pulse generated during a succeeding pixel clock period.

10. The apparatus of claim 9, wherein said inverting means comprises:

inversion selecting means for producing an inversion control signal only during the selected pixel clock period; and means, responsive to said inversion control signal, for logically combining the inversion control signal and the first pulse to produce the first and second complimentary pulses whenever the inversion control signal is active.

11. The apparatus of claim 9, wherein the inversion signal is produced in synchronization with the pixel clock.

12. The apparatus of claim 9, wherein a first complimentary pulse begins at the beginning of the selected clock period and a second complimentary pulse ends at the end of the selected clock period, said first and second complimentary pulses being separated by a time interval equal to the difference between the trailing edge delay and the leading edge delay of the first pulse.

13. A digital electronics system for generating pulses from a series of data words, comprising:

means for translating the series of data words into a series of pulse attribute words, wherein each pulse attribute word includes information for controlling the formation of a corresponding pulse during a clock period;

means for splitting the series of pulse attribute words into two channels;

means corresponding to each channel for accepting pulse attribute words from respective channels, and forming pulses using the information included in the pulse attribute words for controlling the formation of the pulses;

means for generating the pulses, wherein a pulse from a first pulse forming means is generated while a pulse from a second pulse forming means is being formed; and means for selectively inverting a pulse generated during a clock period to produce a pair of complimentary pulses within the selected period.

14. The digital electronics system according to claim 13, wherein the translating means includes means for translating the series of data words into first and second series of pulse attribute words, the first series of pulse attribute words corresponding to formation of a leading edge of each pulse, and the second series of pulse attribute words corresponding to formation of a trailing edge of each pulse.

15. The digital electronics system according to claim 14, wherein each pulse attribute word corresponding to formation of a leading edge of a pulse contains information for a delay, measured from the beginning of a pixel period to the leading edge of the pulse, and each pulse attribute word corresponding to the formation of a trailing edge of a pulse contains information for a delay, measured from the beginning of a pixel period to the trailing edge of the pulse, and wherein the information for the delay to the leading edge of the pulse and the information for the delay to the trailing edge of the pulse are independently variable.

16. The digital electronics system according to claim 15, wherein each pulse attribute word contains information for use by said inverting means so as to enable the selective inversion of a pulse produced in response to an attribute word.

\* \* \* \* \*